United States Patent [19]

Honsinger et al.

[11] 4,388,545
[45] Jun. 14, 1983

[54] ROTOR FOR A PERMANENT MAGNET AC MOTOR

[75] Inventors: Vernon B. Honsinger, Ballston Lake; Russell E. Tompkins, Scotia, both of N.Y.

[73] Assignee: General Electric Company, Schenectady, N.Y.

[21] Appl. No.: 272,153

[22] Filed: Jun. 10, 1981

[51] Int. Cl.$^3$ .......................................... H02K 21/14
[52] U.S. Cl. ................................. 310/156; 310/162; 310/263
[58] Field of Search ............................. 310/162–164, 310/156, 168, 171, 172, 182, 192, 263

[56] References Cited

U.S. PATENT DOCUMENTS

| | | | |
|---|---|---|---|
| 2,444,164 | 6/1948 | Kohlhagen | 310/164 |
| 2,836,743 | 5/1958 | Braun | 310/156 |
| 3,163,788 | 12/1964 | Powers | 310/156 X |
| 3,309,547 | 3/1967 | Woodward | 310/263 X |
| 3,495,113 | 2/1970 | Haydon | 310/156 X |
| 3,571,637 | 3/1971 | Henningsen et al. | 310/156 |

FOREIGN PATENT DOCUMENTS 681348  9/1939  Fed. Rep. of Germany .

*Primary Examiner*—John Gonzales
*Attorney, Agent, or Firm*—William H. Steinberg; James C. Davis, Jr.; Marvin Snyder

[57] ABSTRACT

A rotor for a self-starting permanent magnet AC motor is comprised of a permanent magnet disk mounted on a shaft of non-magnetic material. The magnet has a direction of magnetization parallel to the axis of the shaft resulting in two poles, one on each face of the magnet. Two disks of current carrying material are mounted on the shaft on either side of the magnet to act as starting coils. Pole pieces are mounted on the shaft and surround the starting disks. Claw-like projections spaced about and extending from the periphery of the pole pieces extend inwardly over the periphery of the magnet and starting disks. The claw-like projections from each pole piece are interlaced forming rotor poles of alternating polarity.

3 Claims, 1 Drawing Figure

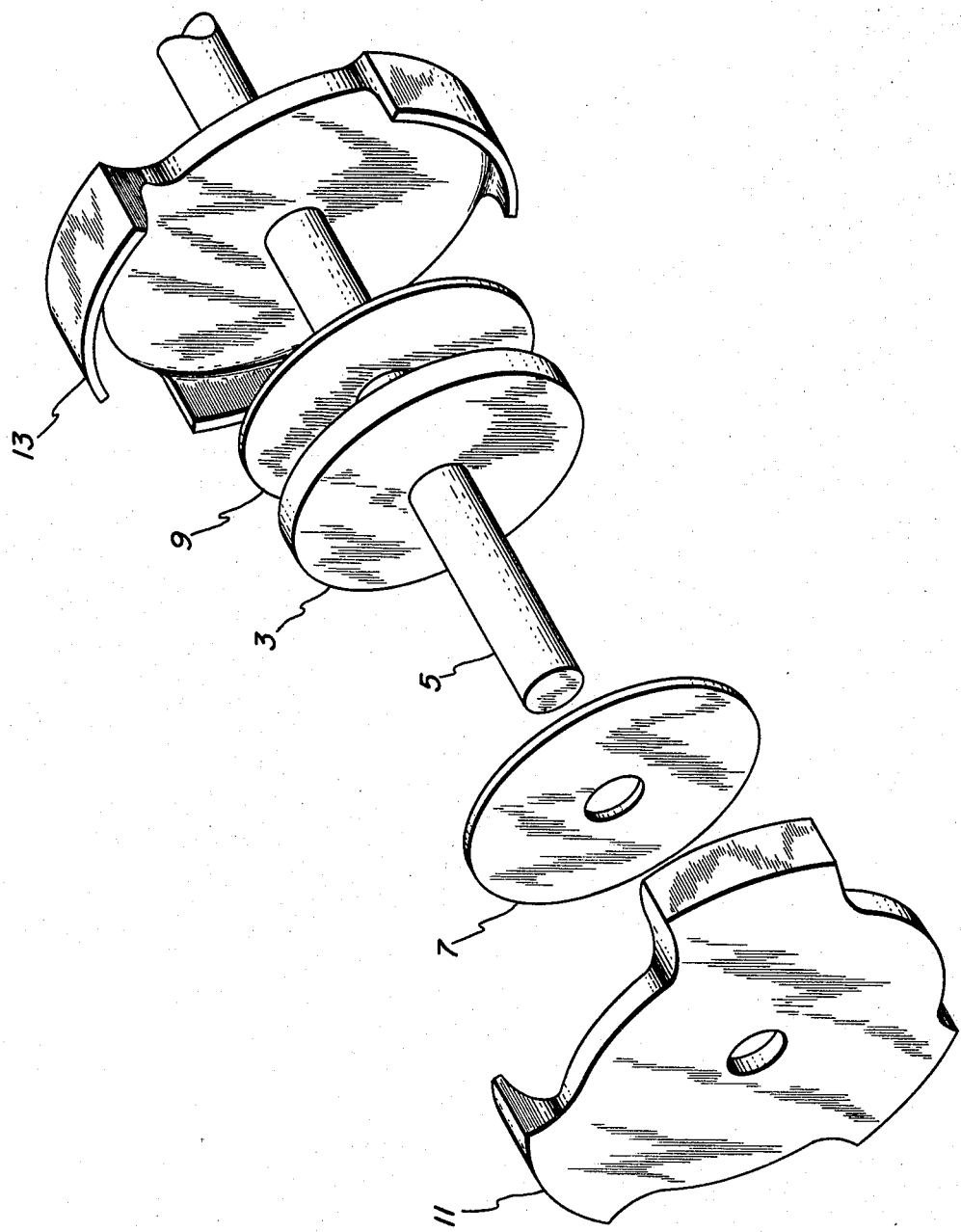

ROTOR FOR A PERMANENT MAGNET AC MOTOR

BACKGROUND OF THE INVENTION

This invention relates to a rotor for a self-starting permanent magnet disk motor and more specifically to a rotor for a self-starting permanent magnet disk motor of the claw-pole or Lundell type.

Sychronous reluctance motors are presently being used in specialized processes that require accurate speed control and in processes where several motors are interconnted and have to be coordinated such as in continuous processing with tension control. Usually power is supplied to the synchronous reluctance motors by an adjustable frequency inverter. Synchronous reluctance motors have a poor power factor which decreases efficiency and increases the kVA rating and cost of the associated inverters.

AC permanent magnet motors are of the synchronous type and have excellent electrical characteristics. Typically, the efficiency of an AC permanent magnet motor will exceed that of a comparable induction motor and will greatly exceed that of a reluctance machine.

A self-starting permanent magnet motor is shown in U.S. Pat. No. 4,139,790 issued to Steen on Feb. 13, 1979. The motor has a laminated rotor with magnet segments inserted in apertures in the lamination and conducting bars inserted in slots in the lamination to form a squirrel cage winding. Laminated rotors are expensive to manufacture.

It is an object of the present invention to provide a low cost, self-starting permanent magnet rotor.

BRIEF SUMMARY OF THE INVENTION

In one embodiment a rotor for a self-starting permanent magnet AC motor is comprised of a permanent magnet disk mounted on a shaft of non-magnetic material. The magnet has a direction of magnetization parallel to the axis of the shaft resulting in two poles, one on each face of the magnet. Two disks of current carrying material are mounted on the shaft on either side of the magnet to act as starting coils. Pole pieces are mounted on the shaft and surround the starting disks. Claw-like projections spaced about and extending from the periphery of the pole pieces extend inwardly over the periphery of the magnet and starting disks. The claw-like projections from each pole piece are interlaced forming rotor poles of alternating polarity.

A method of making a rotor for a self-starting permanent magnet DC motor has the steps of: mounting a permanent magnet disk on a non-magnetic shaft; mounting a pair of pole pieces having claw-like projections close to either side of the magnet but leaving a gap, the claw-like projections spaced about and extending from the periphery of the pole pieces and extending over the periphery of the magnet with the claw-like projections interlacing with one another to form rotor poles; and forcing molten conductive material into the gap between the pole pieces and the magnet to act as starting coils and protect the magnet from demagnetization during starting.

BRIEF SUMMARY OF THE DRAWING

The features of the invention believed to be novel are set forth with particularity in the appended claims. The invention itself, however, both as to organization and method of operation, together with further objects and advantages thereof, may best be understood by reference to the following descriptions taken in conjunction with the accompanying drawing in which:

The FIGURE illustrates an exploded perspective view of the rotor of the present invention.

DETAILED DESCRIPTION OF PREFERRED EMBODIMENT

Referring now to the drawing, a permanent magnet disk 3 is mounted on a non-magnetic shaft 5. The permanent magnet disk has a direction of magnetization parallel to the axis of the shaft 5 resulting in a two-pole magnet with a north seeking and a south seeking face. The permanent magnet can be of the following types: rare earth, manganese aluminum carbon, or preferably ferrite. A pair of current conducting disks 7 and 9 are mounted on shaft 5 on either side of the magnet 3. The disk can be of aluminum but copper is preferred. Pole pieces 11 and 13 are mounted on shaft 5 surrounding the magnet and conducting disk. Pole pieces 11 and 13 have claw-like projections spaced about and extending from the periphery of the pole pieces. The claw-like projections from both pole pieces extend over the periphery of the conducting disk and magnet with the claw-like projections from each pole interlaced to form rotor poles. A six pole rotor is shown but any even number of poles can be formed. The pole pieces can be punched out of low cost steel and shaped with suitable machine tool dies.

The operation of the rotor will now be explained. The rotor can be mounted in a commercially available stator (not shown) having the same number of poles as the rotor. When alternating voltage is applied to the stator, current flows and a rotating flux is set up in the stator windings. The flux passes through the disk and magnet causing current to flow in the disks which set up an opposing flux. The disks act as starting windings giving the motor an induction start. As the rotor begins to rotate, current flowing in the disks reduces until no current is flowing in the conducting disk at synchronous speed. The disks also act to shield the permanent magnet from current surges during starting and transient changes in current during running by setting up opposing flux fields.

The permanent magnet is magnetized axially. The pole pieces adjacent to the magnet are polarized by the magnet so that the pole pieces closest to the north seeking face of the magnet becomes the north pole piece and the pole piece closest to the south seeking pole piece becomes the south pole piece. The interlaced claw-like projections extending from the pole pieces form alternating north and south poles with the polarity of the projections determined by its associated pole piece. Flux passes from the magnet disk to a pole piece. Flux in the pole piece passes to the claw-like projections associated with that pole piece across a cylindrical air gap to the stator (not shown). Flux in the stator passes circumferentially around the stator until it is adjacent to the other pole pieces claw-like projections and again crosses the cylindrical air gap into the other pole piece and re-enters the magnet. A non-magnetic shaft is necessary to prevent the flux loss from one pole piece to the other through the shaft. It is also possible to use a shaft with a sleeve of nonmagnetic material. When the synchronous speed of the motor is approached due to the induction starting, the rotor will pull in and run in synchronism.

A method for making a self-starting rotor for permanent magnet motor will now be described. A permanent magnet disk is mounted on a shaft of non-magnet material. A pair of pole pieces having claw-like projections spaced about and extending from the periphery of the pole pieces is placed on the shaft close to either side of the magnet but leaving a gap. The claw-like extensions from the pole pieces are interlaced and extend over the magnet periphery. Molten conductive material, such as aluminum, is used to fill the gaps between the pole pieces and the magnet. The magnet can be magnetized in a direction parallel to the axis of the shaft after the molten material has hardened in place using a direct current. The aluminum or other current conducting material that is cast in place serves as a starting winding and protects the permanent magnet from demagnetization during starting and transient conditions.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. A rotor for a permanent magnet self-starting motor comprising:
   a shaft of non-magnetic material;
   a permanent magnet disk mounted on said shaft and having a direction of magnetization parallel to the axis of said shaft;
   a pair of starting disks of current conducting material mounted on said shaft one on each side of said permanent magnet disk;
   a pair of pole pieces of flux conducting material mounted on said shaft and surrounding said starting disks, said pole pieces each having claw-shaped extensions spaced about and extending from the periphery of the pole pieces to extend over the periphery of said magnet and said starting disks, said claw shaped extensions being interlaced with one another to form rotor poles of alternating polarity.

2. The rotor of claim 1 wherein said pair of starting disks are made of copper.

3. The rotor of claim 1 wherein said pair of starting disks are made of aluminum.

* * * * *